(12) United States Patent  
Veligdan et al.

(10) Patent No.: US 7,167,619 B2  
(45) Date of Patent: Jan. 23, 2007

(54) INTERACTIVE DISPLAY SYSTEM HAVING A MATRIX OPTICAL DETECTOR

(75) Inventors: James T. Veligdan, Manorville, NY (US); Leonard DeSanto, Dunkirk, MD (US)

(73) Assignee: Brookhaven Science Associates, Upton, NY (US)

( * ) Notice: Subject to any disclaimer, the term of this patent is extended or adjusted under 35 U.S.C. 154(b) by 17 days.

(21) Appl. No.: 10/651,144

(22) Filed: Aug. 28, 2003

(65) Prior Publication Data

US 2005/0047737 A1 Mar. 3, 2005

(51) Int. Cl.
*G02B 6/04* (2006.01)
*H04N 5/66* (2006.01)

(52) U.S. Cl. .................. 385/120; 385/901; 348/804
(58) Field of Classification Search ................ 385/116, 385/120, 121, 129, 901; 348/164, 197, 771, 348/804
See application file for complete search history.

(56) References Cited

U.S. PATENT DOCUMENTS

| | | | |
|---|---|---|---|
| 5,381,502 A | 1/1995 | Veligdan | |
| 5,455,882 A | 10/1995 | Veligdan | |
| 5,577,148 A * | 11/1996 | Kamatani | 385/115 |
| 5,926,168 A * | 7/1999 | Fan | 345/158 |
| 6,175,679 B1 | 1/2001 | Veligdan et al. | |
| 6,222,971 B1 | 4/2001 | Veligdan et al. | |
| 6,301,417 B1 | 10/2001 | Biscardi et al. | |
| 6,400,876 B1 | 6/2002 | Biscardi et al. | |
| 6,519,400 B1 | 2/2003 | Biscardi et al. | |
| 6,535,674 B1 | 3/2003 | Veligdan | |
| 6,650,814 B1 * | 11/2003 | Caplen et al. | 385/127 |
| 6,718,104 B1 * | 4/2004 | Lowry | 385/120 |
| 6,832,727 B1 * | 12/2004 | Veligdan | 235/462.32 |
| 6,859,572 B1 * | 2/2005 | Ishibashi | 385/16 |

* cited by examiner

*Primary Examiner*—Sung Pak
*Assistant Examiner*—Omar Rojas
(74) *Attorney, Agent, or Firm*—Matthew J. Esserman

(57) ABSTRACT

A display system includes a waveguide optical panel having an inlet face and an opposite outlet face. An image beam is projected across the inlet face laterally and transversely for display on the outlet face. An optical detector including a matrix of detector elements is optically aligned with the inlet face for detecting a corresponding lateral and transverse position of an inbound light spot on the outlet face.

42 Claims, 3 Drawing Sheets

INTERACTIVE DISPLAY SYSTEM HAVING A MATRIX OPTICAL DETECTOR

STATEMENT REGARDING FEDERALLY SPONSORED RESEARCH OR DEVELOPMENT

This invention was made with Government support under Contract No. DE-AC02-98CH10886 awarded by the Department of Energy. The Government has certain rights in this invention.

BACKGROUND OF THE INVENTION

The present invention relates generally to optical waveguides, and, more specifically, to optical panels formed therefrom.

U.S. Pat. No. 5,381,502 discloses a polyplanar optical display (POD) including ribbon optical waveguides laminated together. Image light is projected through an inlet face of the display for total internal reflection therein, with a video image being displayed at an opposite outlet face end of the panel.

U.S. Pat. No. 5,455,882 discloses another form of a POD panel configured for interactive operation. The video image is projected outbound through the stacked waveguides, and an interactive light beam may be directed inbound through the outlet face toward the inlet face for detection of its screen position for providing interactive capability.

In both patents, the similarly configured optical panels permit light transmission in either direction from the inlet face to the opposite outlet face, or from the outlet face to the opposite inlet face. This capability permits the use of the optical panels in various applications for providing high definition viewing screens for televisions, computer monitors, and various other types of viewing screens as desired.

Separate mechanical keyboards are commonly known for providing interactivity with various forms of display screens. However, mechanical keyboards are additional components which increase the size, complexity, and cost of the system.

Conventional touchscreens provide an alternate manner for interactive capability. The touchscreen may have various forms which overlay the outlet face and provide interactivity by simply pressing various portions of the touchscreen. The location of the touched spot is determined by the system and corresponds with an interactive option displayed by the outlet face through the touchscreen. Touchscreens are independent devices (i.e. separate from the outlet face) which increase the complexity and cost of the system.

Accordingly, it is desired to provide a display system having interactive capability with corresponding advantages in implementation.

BRIEF SUMMARY OF THE INVENTION

A display system of the present invention includes a waveguide optical panel having an inlet face and an opposite outlet face. An image beam is projected across the panel inlet face laterally and transversely for display on the panel outlet face. An optical detector including a matrix of detector elements is optically aligned with the panel inlet face for detecting a corresponding lateral and transverse position of an inbound light spot on the outlet face.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE PREFERRED EMBODIMENTS

Figure 1:
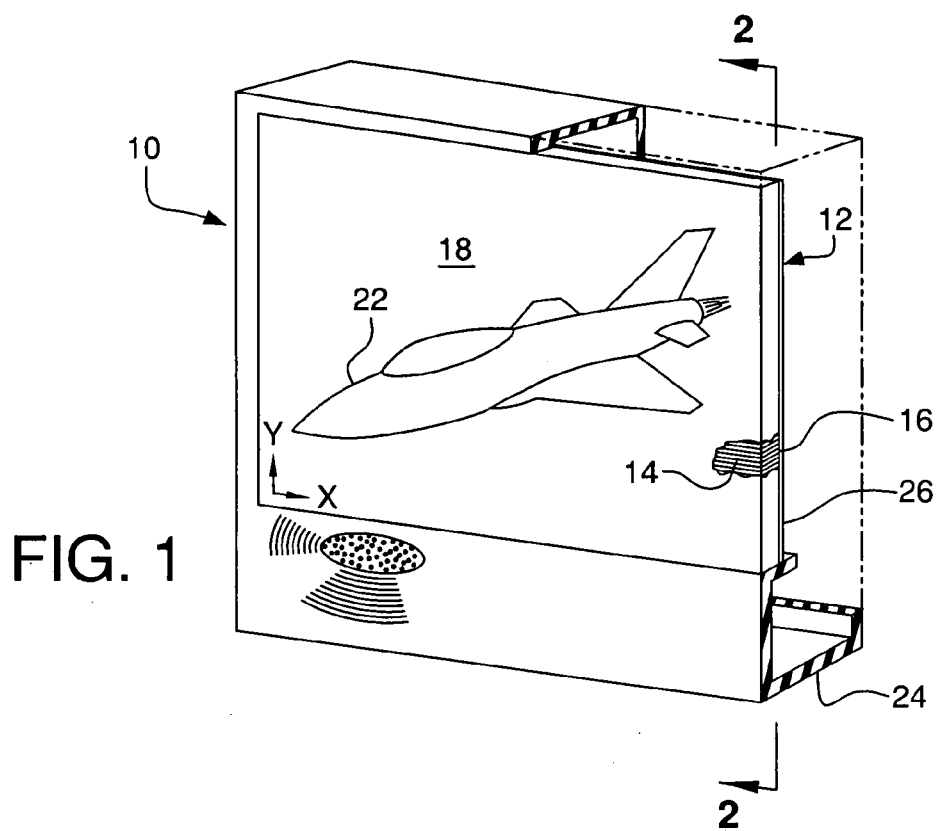
FIG. 1 is a partly sectional, isometric view of an interactive display system in accordance with an exemplary embodiment of the present invention.

Illustrated in FIG. 1 is an interactive display system 10 in accordance with an exemplary embodiment of the present invention. The display system 10 is an assembly of components including an optical display panel 12 which includes a plurality of ribbon optical waveguides 14 which extend the full lateral or horizontal width of the panel 12 and are stacked together vertically or transversely to define the full height of the panel 12.

Figure 2:
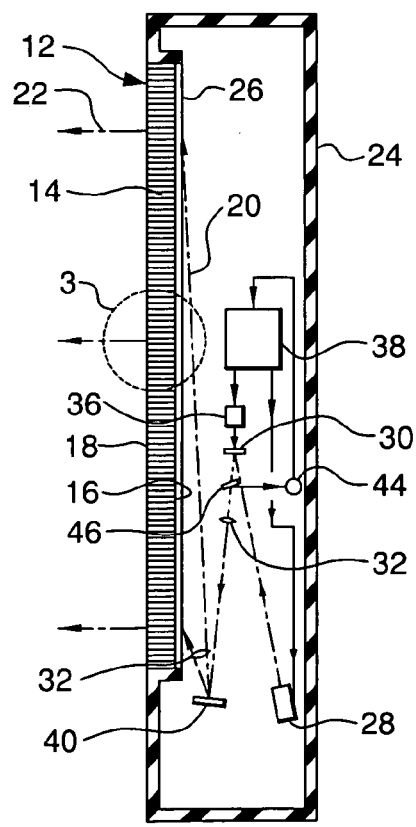
FIG. 2 is a partly sectional side elevational view of the display system illustrated in FIG. 1 and taken along line 2—2 in FIG. 1.

The optical panel 12 may have any conventional form with the waveguides being arranged in various manners such as the wedge of decreasing size shown in U.S. Pat. No. 5,381,502, issued to Veligdan. As shown in FIG. 2, the waveguides 14 preferably have substantially identical size and are stacked vertically together in a column having first or back ends thereof collectively defining a planar inlet face 16, and opposite second or front ends thereof collectively defining a planar viewing outlet face 18.

Figure 3:
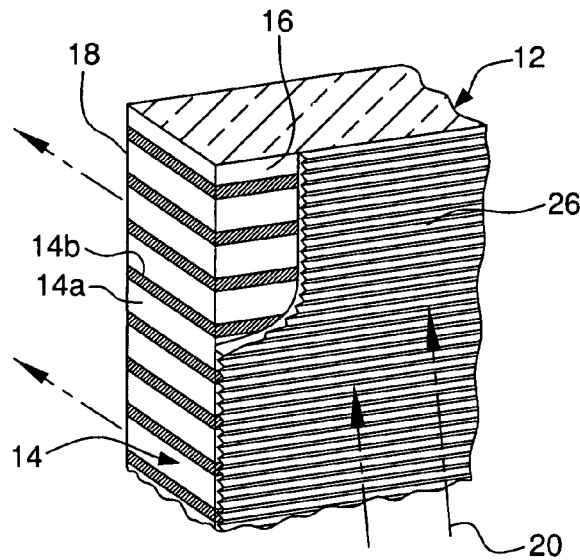
FIG. 3 is partly sectional, enlarged view of a portion of the back of the optical panel illustrated in FIG. 2 and taken within the dashed circle labeled 3 in FIG. 2.

As shown in more detail in FIG. 3, each waveguide 14 includes an optically transparent core 14a disposed between cladding layers 14b. Due to the difference of index of refraction between the core 14a and cladding 14b, an image light beam 20 may be channeled through the individual waveguides 14 with total internal reflection in a conventional manner. As shown in FIG. 2, the image beam 20 is projected on the inlet face 16 for display on the outlet face 18 as an image (or video image) 22 illustrated in FIG. 1.

As shown in FIG. 3, the cladding 14b is preferably a dark color (e.g. black) for enhancing the contrast of the image as seen by an observer or user interacting with the display system 10.

As initially shown in FIGS. 1 and 2, the various components of the display system 10 may be mounted in a suitable housing 24 which is preferably relatively thin for minimizing the space requirements for the display 10. Since the inlet face 16 extends the full width and height of the panel 12, it is desirable to additionally provide a light coupler 26 over the inlet face 16 for redirecting the incident image light 20 to minimize the depth requirement of the housing 24.

In a preferred embodiment, the coupler 26 comprises Fresnel prismatic microscopic grooves which are straight along the full width of the panel 12 and spaced vertically apart along the height of the panel 12. A preferred form of the coupler 26 is a Transmissive Right Angle Film (TRAF) commercially available from the 3M Company of St. Paul, Minneapolis, under the trade name TRAF II. This TRAF film permits the image light 20 to be projected at a small acute angle over the back of the optical panel 12, and then redirected up to about 90 degrees for channeling through the waveguides 14 for display from the outlet face 18. Other types of couplers of the types mentioned in U.S. Pat. No. 6,301,417, issued to Biscardi et al, may be alternatively employed. Alternatively, the coupler 26 may be eliminated, and the image beam may be aimed directly at the inlet face in typical rear-projection fashion.

The optical panel 12 may have any suitable configuration utilizing a plurality of stacked optical waveguides in which light may be transmitted in either direction between the inlet face and outlet face sides thereof. As shown schematically in FIGS. 2 and 4, the optical panel 12 is mounted in the housing 24 for cooperating with a suitable light projector 28 having any conventional configuration for projecting the light used in forming any desired video image 22. The light exiting the projector 28 is preferably in the form of a beam, rather than diffuse light.

For example, the projector 28 may include a lamp for producing white light which is projected through suitable projection lenses for use in creating any desired video image 22 on the outlet face 18. Color may be added to the light beam by, for example, rotating a conventional color wheel in a known manner inside or outside the projector 28.

The projector 28 preferably cooperates with a digital imaging device 30 for digitally creating the desired video image. Any suitable digital imaging device can be used, but a Digital Micromirror Device (DMD) imaging device 30 is preferred. The DMD 30 is an imaging device optically aligned between the projector 28 and the inlet face 16 which selectively reflects the image beam 20 through a cooperating projection lens 32 to form the video image. The imaging device 30 is a small semiconductor light switch including a matrix array of, for example, thousands of microscopically sized image mirrors 34 each mounted on a hinge for being individually tilted back and forth, typically with an angular range of plus or minus 10 degrees when activated. When inactive, the individual micromirrors 34 assume an intermediate relaxed position. The DMD 30 is a conventional device commercially available from Texas Instruments Inc. of Dallas, Tex. for use in digital light processing in creating digital images for various applications.

Figure 4:
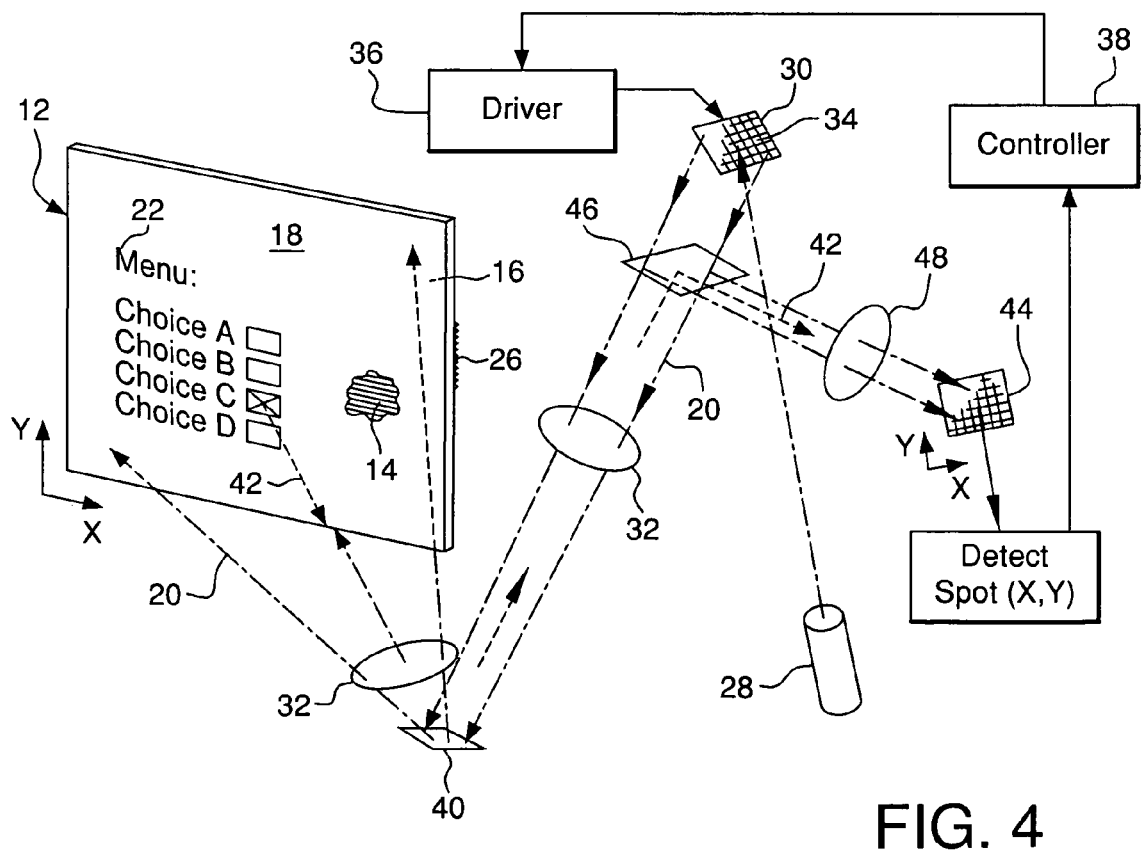
FIG. 4 is a schematic representation of the display system illustrated in FIGS. 1–3 including a digital imaging device and cooperating optical detector matrix in accordance with an exemplary embodiment of the present invention.

The DMD imaging device 30 is illustrated schematically in FIG. 4 in cooperation with a conventional electronic driver 36 which is used to independently control each of the thousands of micromirrors 34 therein. The imaging device 30 is operatively coupled to an electrical controller 38 through the driver 36 for controlling operation thereof and the form of the video image 22 displayed on the panel 12.

The controller 38 may take any conventional configuration such as a digital microprocessor programmed with suitable software for displaying any desired video image for any suitable purpose. The controller 38 may be used for displaying ordinary television video images from the panel 12, or other video images typically displayed on computer monitors, automated teller machines (ATM), etc.

For purposes of this disclosure, the term "outbound" is defined as the direction from the inlet face 16 towards the outlet face 18, and the term "inbound" is defined as the direction from the outlet face 18 towards the inlet face 16.

As shown in FIGS. 2 and 4, a folding mirror 40 is preferably used in the outbound beam path between the imaging device 30 and the panel 12 for providing a compact configuration while redirecting the outbound image beam at the small acute incidence angle that is capable of being turned by the light coupler 26. The projection lens 32 is preferably formed in two groups of single or multiple lenses correspondingly disposed upbeam and downbeam of the folding mirror 40 to suitably image the image beam over the entire inlet face of the panel as redirected therein by the coupler 26.

FIG. 4 illustrates the basic operation of the display system of the present invention in which the controller 38 suitably operates the electronic driver 36 for positioning the various micromirrors 34 in the imaging device 30 for creating any desired video image 22 projected on the outlet face 18. The imaging device 30 spatially and temporally modulates the light beam emitted from the projector 28 for creating the image beam 20 which is imaged through the projection lenses 32 and redirected by the folding mirror 40 across the light coupler 26 for final redirection through the optical panel 12 for display on the outlet face 18 thereof.

Since the optical panel 12 permits light transmission either outbound therethrough or inbound therethrough, the same panel may be used for both displaying any desired video image and providing interactive capability by a user. The exemplary video image illustrated in FIG. 4 is a menu of suitable choices which may be selected by the user for any desired application. For example, the optical panel may be part of a projection TV, computer monitor or ATM machine which receives instructions from the intended user. Instead of providing a separate and dedicated keyboard for interacting with the system, the optical panel 12 itself may be used in accordance with the present invention.

In response to the image beam generated menu illustrated in FIG. 4, an inbound probe light beam 42 in the form of a light spot is suitably formed on the panel at a selected lateral position X along the width of the outlet face 18 and transverse position Y along the height of the outlet face for identifying the desired menu choice.

An optical detector 44 including a two-dimensional array or matrix of optical detector elements is suitably optically aligned with the inlet face 16 for optically detecting a corresponding lateral and transverse position of the inbound light spot on the outlet face. Since the imaging device 30 is specifically configured for producing a two-dimensional video image 22 on the outlet face 18, the optical detector 44 is correspondingly configured for detecting the two-dimensional location X,Y of the probe light spot at any location on the outlet face, either in a dedicated portion thereof or the entire outlet face as desired.

As shown in FIG. 4, the optical detector 44 is preferably located remotely from the panel and suitably spaced from and behind the inlet face 16 in any desired location within the housing where space permits. In a preferred embodiment, the projection lenses 32 are configured for focusing the outbound image beam on the outlet face as well as imaging on the detector 44 the inbound probe beam 42 inbound in the opposite direction from the outbound image beam.

In this configuration, a suitable beam splitter 46 is optically aligned in a straight path between the adjacent projection lens 32 and imaging device 30 in the outbound beam path from the projector 28 to the inlet face 16. In its simplest form, the beam splitter may be a plate of clear glass angled at 45° to the outbound beam path which permits transmission of the outbound image beam therethrough. Other types of beam splitters may alternatively be utilized.

Correspondingly, the optical detector 44 is also optically aligned with the beam splitter 46 for receiving the inbound probe beam 42 reflected from the splitter 46. In this way, both the imaging device 30 and optical detector 44 are optically aligned with the primary beam path to and from the screen by the common beam splitter 46.

The outbound image beam is readily transmitted through the beam splitter 46 for display on the outlet face 18. And, the inbound probe beam 42 is transmitted from the panel in a preferably substantially common optical path with the outbound image beam until it is diverted at the beam splitter 46 and directed toward the optical detector 44.

In this way, the lenses 32 may be used for the common function of projecting the outbound image beam 20 while also imaging the inbound probe beam 42 in a single-path lens system for reducing complexity and space requirements of the overall display system. The outbound and inbound light beams may be transmitted simultaneously if desired, or may be temporally alternated in time. In either configuration, the inbound probe beam 42 is effectively split from the path of the outbound image beam 20 by the beam splitter 46 and directed to the optical detector 44.

The projection lenses 32 inherently are effective for imaging the light spot formed at the outlet face onto a corresponding location on the optical detector 44 from which the lateral and transverse position of the probe beam may be readily determined.

The function of the projection lenses 32 is preferably to expand and focus the image beam 20 generated at the imaging device 30 to the larger size required for filling the larger inlet face 16. Correspondingly, the same projection lenses 32 may be used to contract and focus the probe beam 42 from any location over the outlet face to the smaller size of the optical detector 44 for maximizing detection efficiency thereof. The matrix array of the optical elements in the detector 44 preferably have a spatial correspondence with the desired area of the outlet face 18 so that the spatial lateral and transverse coordinates X, Y on the optical detector 44 may directly correspond with lateral and transverse coordinates X, Y of the location of the light spot 42 on the outlet face.

The electrical controller 38 is preferably in the form of a digitally programmable computer which is operatively coupled to the optical detector 44 for determining the lateral and transverse position of the light spot detected at the outlet face when transmitted inbound through the panel.

Since the optical detector 44 is preferably relatively small and smaller than the outlet face, it may be scaled relative thereto for readily determining the two-dimensional position of the light spot at the outlet face by detecting the corresponding position of the spot as imaged on the detector 44. The size and configuration of the detector 44 may be selected to directly scale with the entire surface area of the outlet face, or may be scaled to any desired portion thereof in which interactive capability is desired.

For example, the detector 44 may be about the same size as the imaging device 30 when the common projection lenses 32 are used for both the outbound and inbound beams. Or, the detector 44 may be smaller or larger than the imaging device 30. In these cases, a corresponding optical element 48, such as one or more lenses, illustrated in FIG. 4, may be optically aligned between the beam splitter 46 and detector 44 for contracting or expanding (and optionally, further focusing) the inbound probe beam 42 as required to match the detector size and configuration to that of the outlet face 18. An advantage of smaller detectors is the corresponding reduction in cost thereof, which reduces the overall cost of the display system.

The digital imaging device 30 may have any suitable form optically aligned between the splitter 46 and the projector 28 or any light source for forming the image beam in the two-dimensional array of picture elements or pixels. These pixels are projected through the lenses 32 for creating the resulting video image on the outlet face.

Correspondingly, the detector elements in the optical detector 44 are similarly arranged in a two-dimensional array which corresponds with the two-dimensional array of pixels in the imaging device 30 as well as those pixels displayed on the outlet face 18. In this way, a direct correlation is provided between the pixel locations on the outlet face 18 and the corresponding spatial locations of the detector elements in the optical detector 44. By forming the probe light spot at any desired location on the outlet face 18, the light spot is detected at a corresponding spatial location within the matrix array of the optical detector 44 for determining the precise lateral and transverse location of the probe spot.

Since the controller 38 illustrated in FIG. 4 is also used for controlling operation of the driver 36, the spatial location of the displayed image 22 is known by the controller. Accordingly, the controller may be suitably programmed for displaying regions on the screen in which a user may form the light spot for interacting with the display system.

In FIG. 4, four boxes are displayed on the outlet face 18 indicative of four possible choices for interaction. The light spot is formed in the box for choice C with the corresponding probe beam being transmitted inbound to the optical detector 44 which determines the spatial position X, Y from the outlet face. The controller 38 is then suitably configured for comparing the detected position of the probe beam with the displayed video image for providing interactive feedback to the display.

Figure 5:
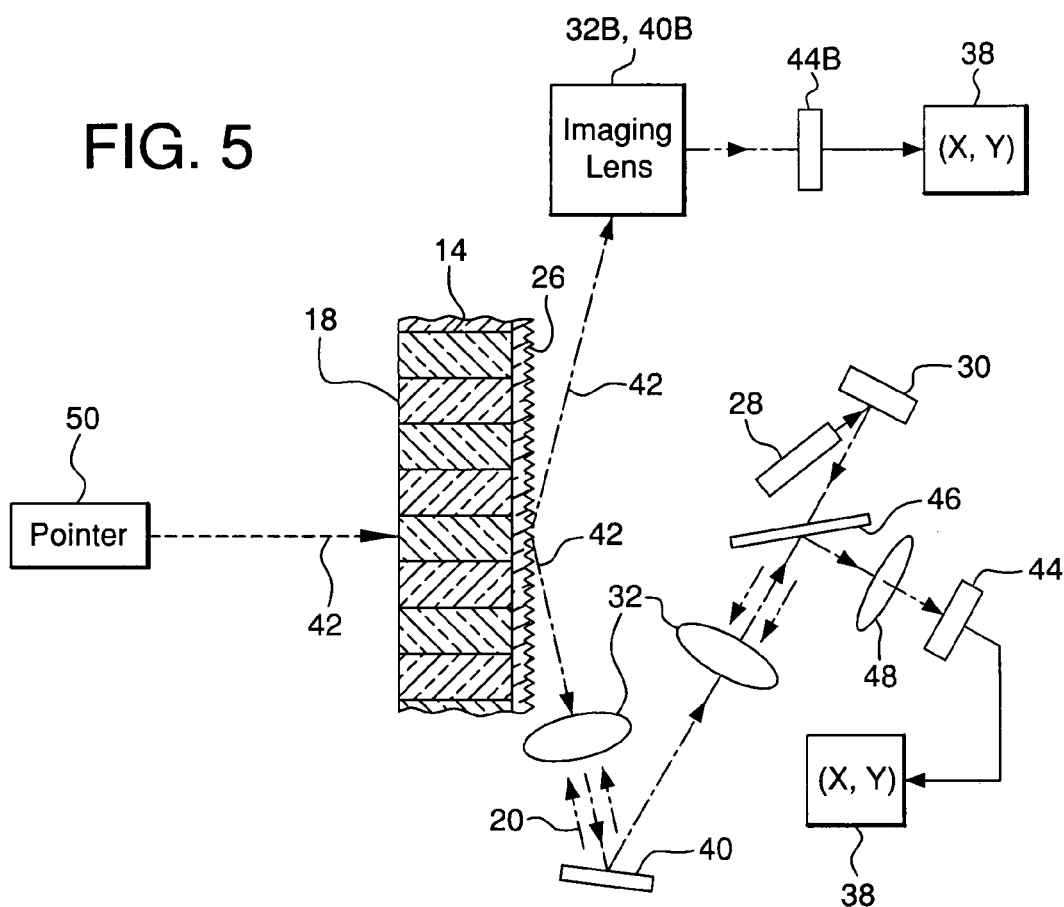
FIG. 5 is a schematic side elevational view of the display system illustrated in FIG. 4 including a cooperating pointer in accordance with alternate embodiments of the present invention.

FIG. 5 illustrates an optical pointer 50 which may be used for projecting the light spot on the outlet face 18 for inbound transmission through the optical panel and inbound imaging by the optical detector. The pointer 50 may be configured similar to a typical television remote control device being battery powered and having a suitable light projector therein. In a preferred embodiment, the probe beam is infrared (IR) light for providing enhanced discrimination over the image beam which is mainly visible light. The (e.g. IR) probe beam may be modulated to enhance the ability of the detector to discriminate the inbound probe beam from background or extraneous light normally entering the outlet face 18 during operation or found in the panel 12 from the image beam 20 itself.

The optical detector 44 is preferably a two-dimensional array of photodiodes configured for detecting IR light, and in a preferred embodiment may be in the form of a charged coupled device (CCD) commonly found in video cameras. In this way, the visible image beam may be projected outbound on the outlet face while the IR probe beam 42 is projected inbound simultaneously. The beam splitter 46 in this embodiment is preferably a dichroic mirror which permits transmission of the outbound visible beam while reflecting the inbound IR beam to the detector 44. Interactive capability may thusly be effected simultaneously with the projection of the video image with substantial discrimination between the visible beam and the IR probe beam.

Alternatively, the pointer 50 may be configured for projecting visible (or both visible and IR) light which may be temporally and/or spatially uncoupled from the outbound image beam for providing interactive capability. Since the same waveguides 14 may be used for both transmitting the outbound visible beam and the inbound probe beam, suitable discrimination between the two beams is desired, for example, either by providing different wavelengths of the two light beams or by temporal and/or spatial uncoupling therebetween. Also, similar discrimination techniques may be employed if the pointer 50 is configured for projecting only IR light as per the embodiment above.

Figure 6:
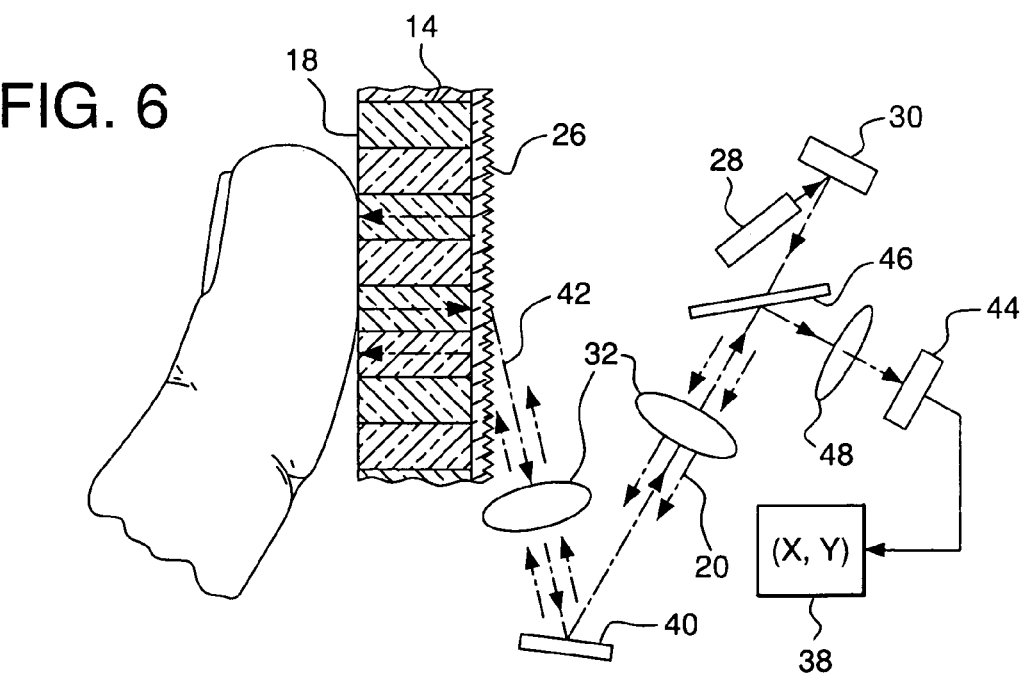
FIG. 6 is a schematic side elevational view of the display system illustrated in FIG. 4 effecting interactivity using at least a portion of the image beam reflected back through the panel.

FIG. 6 illustrates yet another embodiment of the present invention wherein the finger of a user may be used to touch the outlet face 18 for reflecting at least a portion of the outbound image beam at the outlet face to form the inbound probe beam 42. The outlet face 18 may be covered, for example, with a finger, palm (or other body part), pencil eraser, stylus (i.e. preferably of blunt type), or paper (e.g. for bar-code reading purposes) for reflecting inbound at least a portion of the outbound image beam, the covering element either directly touching the outlet face 18 or providing a reflective surface spaced closely near the outlet face 18.

In this embodiment, the projector 28 may be configured for projecting the image beam in both visible and infrared light, with the beam splitter 46 being a dichroic mirror. Both the visible and infrared components of the image beam are projected outbound through the optical panel for forming the visible video image on the outlet face thereof. The user's finger may be used to touch any desired location of the outlet face and cover several of the waveguides 14 therein for reflecting at least a portion of the image beam inbound as the probe beam.

Alternating ones of the waveguides may be dedicated for transmitting the outbound image beam and the reflected inbound probe beam. The optical detector 44 may then be used for observing the dedicated inbound waveguides for detecting any returning IR light indicative of light reflection by the user's finger. In this way, the reflected probe beam may be used for determining the lateral and transverse position of the reflected portion of the image beam for providing interactive capability. Of course, as an alternative, the outbound image beam and the reflected inbound probe beam may both be transmitted within the same waveguide.

FIG. 5 illustrates an alternate embodiment of the present invention in which the projection lenses 32 may be used in one optical path for projecting the outbound image beam 20 on the outlet face 18. And, a separate imaging lens 32B and corresponding folding mirror 40B are spaced from the projection lenses 32 for separately imaging and detecting the inbound light spot from the outbound video image. Since the optical coupler 26 can receive incident light at substantially opposite acute angles from the prismatic grooves thereof, the imaging lens 32B may be optically aligned at the upward acute angle with the coupler 26, and the projection lens 32 may be optically aligned at a substantially opposite downward acute angle with the coupler 26.

In this way, the image beam may be projected upwardly over the surface area of the coupler 26, while the inbound probe beam 42 is deflected partly upwardly from the coupler 26 for imaging on the cooperating optical detector 44B aligned therewith. FIG. 5 illustrates two optical detectors 44 and 44B for simplicity of presentation, although one or the other optical detector and corresponding optics would be preferably used in a specific embodiment. Alternatively, the use of both optical detectors and corresponding optics may be contemplated.

Since the optical panel 12 used in the various embodiments disclosed above can transmit light both outbound and inbound, interactive capability may be provided with the simple introduction of the two-dimensional matrix array optical detector 44. A suitable imaging lens system may be used for imaging the probe spot from the inlet face of the optical panel onto the optical detector with a corresponding spatial orientation therebetween. Simultaneous spatial and temporal interactive capability may be effected preferably using infrared light, or interactivity may be effected by spatially and/or temporally uncoupling the probe beam from the displayed video image.

Various forms of the light projector may be used for displaying two-dimensional video images. Digitally formed images using the DMD device are preferred. And, digital video images may otherwise be formed using, for example, liquid crystal displays (LCD) or light emitting diodes (LED). The projector may alternatively be in the form of a conventional slide projector if desired.

Digital video images are preferred for improving the correspondence between the displayed pixels and the inbound probe beam detected by the matrix array detector. The matrix detector may be aligned with any desired portion of the outlet face or the entire outlet face for providing interactive capability. And, in a preferred embodiment, the same projection lens system is also used for imaging the inbound probe beam on the optical detector for precise determination of the spatial location of the spot on the outlet face.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

We claim:

1. A display system, comprising:
    an optical panel including a plurality of optical waveguides stacked together, with first ends thereof defining an inlet face, and opposite ends thereof defining an outlet face;
    a projector for projecting an image light beam at said inlet face for display on said outlet face; and
    an optical detector including a two-dimensional array of detector elements is optically aligned with said inlet face for detecting a corresponding lateral and transverse position of an inbound light spot on said outlet face, wherein said optical detector is spaced from said inlet face; and
    an imaging lens optically aligned between said inlet face and said detector for imaging onto said detector said light spot transmitted inbound through said panel.

2. A display system according to claim 1 further comprising a controller operatively coupled to said detector for determining said lateral and transverse position of said light spot detected on said outlet face.

3. A display system according to claim 2 wherein said optical detector is scaled relative to said outlet face and is capable of determining said position of said spot on said outlet face by detecting a position of said spot imaged on said detector.

4. A display system according to claim 3 wherein said panel further includes a light coupler at said inlet face for redirecting said image beam from said projector outbound through said panel, and said detector is optically aligned with said coupler.

5. A display system according to claim 4 further comprising:
a projection lens optically aligned between said projector and said inlet face for imaging said image beam over the inlet face as redirected therein by the coupler;
wherein said imaging lens is spaced from said projection lens for separately imaging said inbound light spot from said image beam.

6. A display system according to claim 5 wherein said imaging lens is optically aligned at an acute angle with said coupler, and said projection lens is optically aligned at a substantially opposite acute angle with said coupler.

7. A display system according to claim 4 further comprising:
a beam splitter optically aligned between said imaging lens and said projector in one path, and optically aligned with said detector in another path; and
said imaging lens is configured for both imaging said outbound image beam over the inlet face as redirected therein by the coupler, and imaging said inbound light spot on said detector;
wherein said outbound image beam has been transmitted through said beam splitter, and wherein said imaged inbound light spot is redirected at said beam splitter.

8. A display system according to claim 7 further comprising a digital imaging device optically aligned between said splitter and said projector for forming said image beam in a two-dimensional array of pixels.

9. A display system according to claim 8 wherein said two-dimensional array of detector elements in said optical detector corresponds with said two-dimensional array of pixels of said image beam formed by said imaging device.

10. A display system according to claim 7 wherein said beam splitter comprises a dichroic mirror.

11. A display system according to claim 8 wherein said imaging device comprises a digital micromirror device.

12. A display system according to claim 7 further comprising an optical pointer for projecting said light spot on said outlet face for inbound imaging onto said detector.

13. A display system according to claim 7 further comprising an optical element optically aligned between said beam splitter and said optical detector for providing supplemental imaging of said inbound light spot on said detector.

14. A display system according to claim 1 wherein the waveguides are in the form of ribbons.

15. A display system according to claim 1 wherein said inbound light spot is formed by covering a spot on said outlet face with at least one covering element selected from the group consisting of finger, palm, pencil eraser, stylus, and paper.

16. A display system according to claim 15 wherein said covering element reflects at least a portion of said image beam inbound through at least one waveguide to thereby provide said inbound light spot.

17. A display system according to claim 15 wherein said covering element reflects at least a portion of said image beam into an adjoining waveguide to thereby provide said inbound light spot.

18. A display system according to claim 15 wherein said covering element is in contact with said outlet face.

19. A display system according to claim 15 wherein said covering element is spaced from said outlet face.

20. A display system, comprising:
an optical panel including a plurality of optical waveguides stacked together, with first ends thereof defining an inlet face, and opposite ends thereof defining an outlet face;
a projector for projecting an image light beam;
a digital imaging device optically aligned between said projector and said panel for forming said image beam in a two-dimensional array of pixels;
a projection lens optically aligned between said imaging device and said panel for imaging said image beam across said inlet face for display on said outlet face;
a beam splitter optically aligned between said imaging device and said projection lens for transmitting said image beam outbound therebetween; and
an optical detector optically aligned with said beam splitter for detecting a lateral and transverse position of a light spot from said outlet face transmitted inbound through said panel and through said projection lens and diverted to said detector by said beam splitter.

21. A display system according to claim 20 further comprising a controller operatively coupled to said detector for determining said lateral and transverse position of said light spot detected on said outlet face.

22. A display system according to claim 20 wherein said panel further includes a light coupler at said inlet face for redirecting said image beam from said projection lens outbound through said panel.

23. A display system according to claim 22 further comprising a folding mirror optically aligned between said projection lens and said coupler for redirecting said image beam at an acute incidence angle with said coupler.

24. A display system according to claim 23 wherein said projection lens comprises two groups correspondingly disposed upbeam and downbeam of said folding mirror.

25. A display system according to claim 20 wherein said imaging device comprises a digital micromirror device.

26. A display system according to claim 20 wherein said optical detector comprises a two-dimensional array of detector elements.

27. A display system according to claim 20 wherein said beam splitter comprises a dichroic mirror.

28. A display system according to claim 20 wherein the waveguides are in the form of ribbons.

29. A method of providing interaction in a display system having a stacked waveguide optical panel displaying on an outlet face thereof an image formed from an outbound image beam projected on an inlet face thereof, said method comprising:
forming an inbound probe beam on said outlet face;
imaging said probe beam subsequent inbound transmission thereof through the panel;
detecting a lateral and transverse position of said probe beam imaged from said panel; and
comparing said detected position of said probe beam with said image for providing interactive feedback to said display.

30. A method according to claim 29 further comprising transmitting said inbound probe beam from said panel in a separate optical path from said outbound image beam to said panel.

31. A method according to claim 29 further comprising transmitting said inbound probe beam from said panel in a substantially common optical path with said outbound image beam to said panel.

32. A method according to claim 31 further comprising transmitting said outbound and inbound beams through a common projection and imaging lens.

33. A method according to claim 32 further comprising splitting said inbound probe beam from the path of said outbound image beam, and detecting a lateral and transverse position of said inbound probe beam split from said outbound image beam path.

34. A method according to claim 29 wherein said probe beam is substantially infrared light.

35. A method according to claim 34 wherein said image beam is substantially visible light.

36. A method according to claim 29 further comprising reflecting at least a portion of said outbound image beam at said outlet face to form said inbound probe beam.

37. A method according to claim 36 wherein said outbound image beam comprises visible and infrared light, and an infrared light component of said reflected inbound probe beam is detected for determining a lateral and transverse position of said reflected portion of said image beam.

38. A method according to claim 36 wherein said reflecting occurs by covering a spot at said outlet face with at least one covering element selected from the group consisting of finger, palm, pencil eraser, stylus, and paper.

39. A method according to claim 38 wherein said covering element reflects said at least a portion of said outbound image beam into an adjoining waveguide to thereby provide said inbound probe beam.

40. A method according to claim 38 wherein said covering element is in contact with said outlet face.

41. A method according to claim 38 wherein said covering element is spaced from said outlet face.

42. A method according to claim 29 wherein the waveguides are in the form of ribbons.

* * * * *